H. FELDMEIER & C. B. DALZELL.
APPARATUS FOR PASTEURIZING MILK.
APPLICATION FILED AUG. 23, 1909.
1,067,513.
Patented July 15, 1913.
2 SHEETS—SHEET 1.
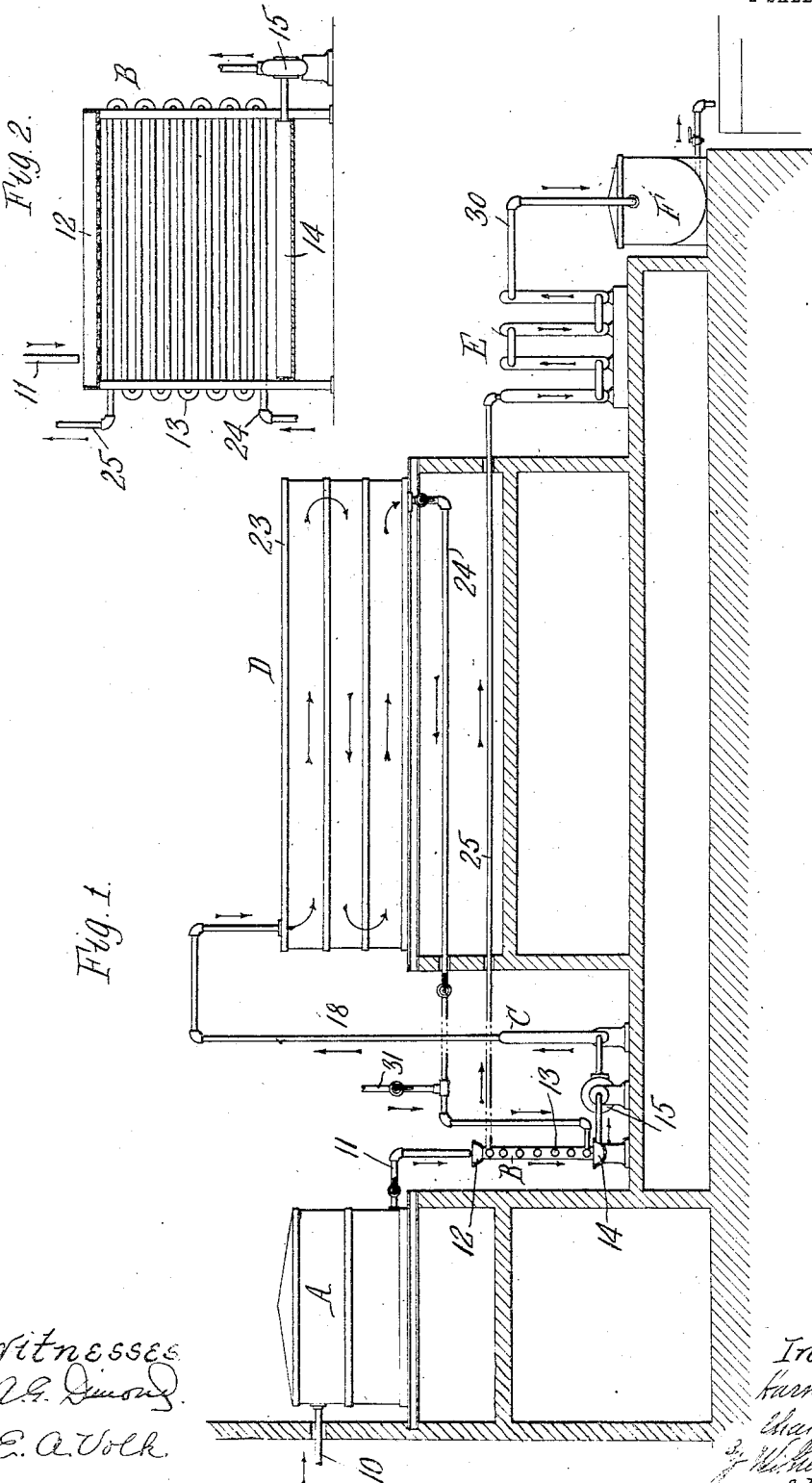

H. FELDMEIER & C. B. DALZELL.
APPARATUS FOR PASTEURIZING MILK.
APPLICATION FILED AUG. 23, 1909.
1,067,513.
Patented July 15, 1913.
2 SHEETS—SHEET 2.
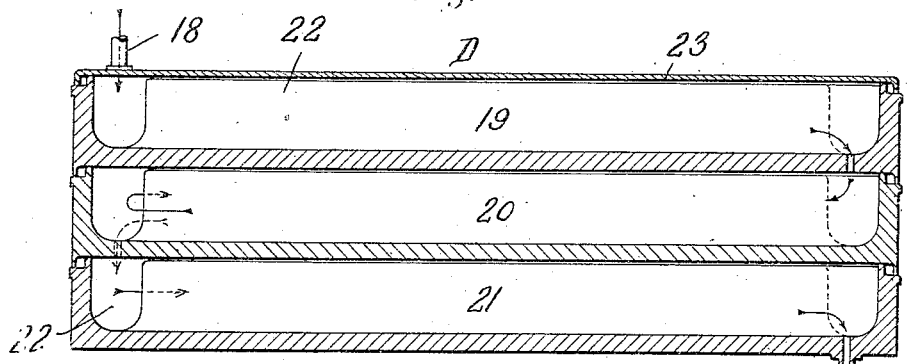
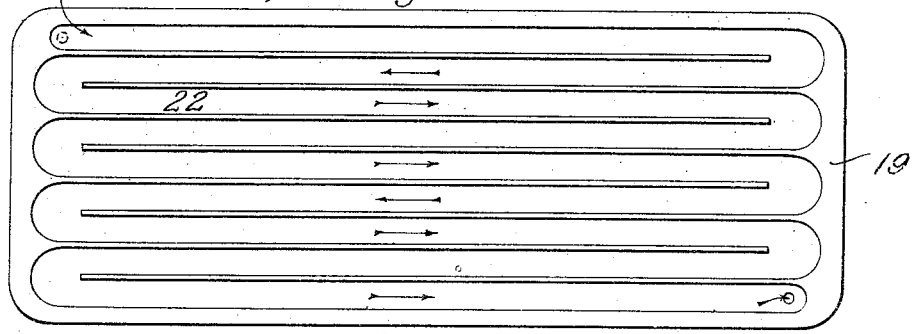
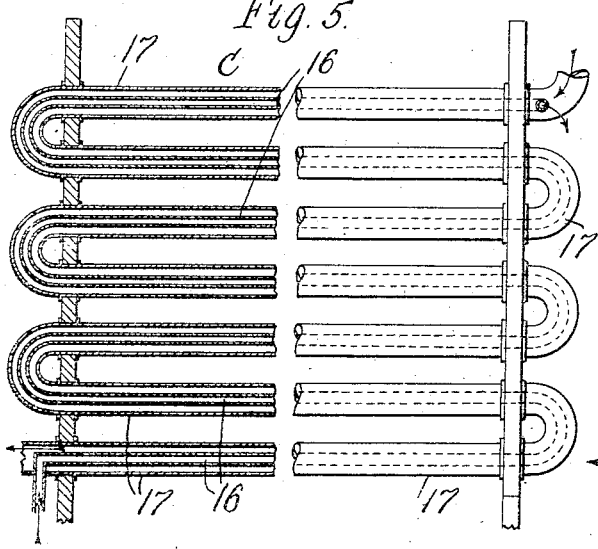
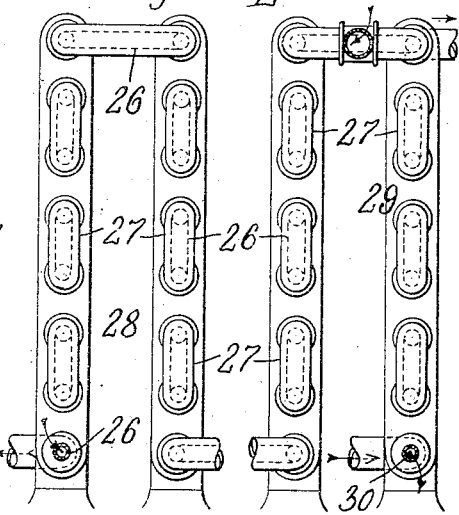

UNITED STATES PATENT OFFICE.

HARVEY FELDMEIER AND CHARLES B. DALZELL, OF LITTLE FALLS, NEW YORK, ASSIGNORS TO D. H. BURRELL & COMPANY, OF LITTLE FALLS, NEW YORK.

APPARATUS FOR PASTEURIZING MILK.

1,067,513.     Specification of Letters Patent.     Patented July 15, 1913.

Application filed August 22, 1909. Serial No. 514,322.

*To all whom it may concern:*

Be it known that we, HARVEY FELDMEIER and CHARLES B. DALZELL, citizens of the United States, residing at Little Falls, in the county of Herkimer and State of New York, have invented a new and useful Improvement in Apparatus for Pasteurizing Milk, of which the following is a specification.

This invention relates to the pasteurization of milk, cream and similar liquids and has for its object to provide convenient and reliable means for holding the milk at the pasteurizing temperature for the required length of time while flowing in a continuous stream from the heater to the cooler.

In the accompanying drawings, consisting of two sheets: Figure 1 is a diagrammatic sectional elevation of this improved apparatus. Fig. 2 is an elevation of the preliminary heater and aerator. Fig. 3 is a vertical longitudinal section of the part of the apparatus in which the milk is subjected for the necessary period of time to the pasteurizing temperature and which is herein called the holder. Fig. 4 is a top plan view of the same with the cover removed. Fig. 5 is a sectional elevation of the final heater. Fig. 6 is an end elevation of the cooler.

Like reference characters refer to like parts in the several figures.

A represents a receptacle to which the milk is supplied by a pipe 10, or otherwise, and from which the milk is drawn by a pipe 11.

B represents the preliminary heater and aerator which comprises a horizontal feed trough 12, a heating and aerating coil 13 arranged beneath the same, and a receiving trough 14 below the coil. The milk passes from the pipe 11 into the receiving trough 12, flows from the latter upon the upper part of the aerating and heating coil 13, descends on the outer side of the coil in a film or thin sheet and in doing so becomes heated to a certain extent and gives off its odors, vapors or gases, and finally collects in the lower trough 14.

C represents the final heater which receives the milk from the trough 14 and which completes the heating of the milk to the pasteurizing temperature.

15 represents a pump which is employed, if necessary, for removing the milk from the trough 14 and forcing it through this heater. The latter consists of an inner coil or passage 16 through which the milk flows and an outer or surrounding tube or passage 17 to which steam or hot water is supplied.

D represents the holder which receives the heated milk from the final heater C by a pipe 18 and which comprises a flow passage for the milk of such length that the milk in passing through the same occupies the period of time which is necessary for effecting the pasteurization, without, however, allowing the milk to come to a state of rest. For illustration, if it is desired to hold the milk at a certain temperature for thirty minutes and the speed of the milk in the flow passage is twelve feet per minute, the length of the flow passage should be three hundred and sixty feet. A suitable construction of this holder is described and shown in an application for patent of even date herewith, Serial No. 514323. In this construction the holder comprises three superposed horizontal sections 19, 20, 21, each having in its upper side an open-topped sinuous trough or flow passage 22 and each upper section discharging the milk from the delivery end of its trough or passage into the receiving end of the next lower section. The top section is closed by a cover 23 and each upper section forms a cover for the section next below.

The milk flows from the discharge end of the holder D through a pipe 24 to the lower end of the coil 13 of the preliminary heater and aerator B, flows upwardly through said coil and escapes from the upper end thereof through a pipe 25 through which the milk flows to the cooler E. In passing through the coil 13 the hot milk gives off part of its heat to the cold milk which flows downwardly over the outer side of the coil, and this heat is so recovered and utilized for partially heating the incoming cold milk, while the hot milk is partially cooled by this regenerating operation.

The cooler E consists of an inner coil or passage 26 through which the milk flows and an outer or inclosing coil or passage 27 through which the cooling medium flows. The cooler is preferably composed of a section 28 through which ice water flows and a section 29 for brine.

F represents a storage tank or vat which receives the pasteurized milk by a pipe 30 and in which the milk is stored until it is bottled or otherwise disposed of.

In the operation of this apparatus the cold milk having a temperature of about 60 degrees F. is first deodorized, aerated and partially heated in flowing in a film or thin sheet over the coil 13 of the regenerating preliminary heater and aerator B. In starting the operation the coil of this heater is supplied with hot water through a pipe 31, but when the hot milk begins to flow from the holder D the hot water is cut off and the hot milk is directed to the coil. The cold milk is heated by the preliminary heater to a temperature of about 120 degrees F. and is then further heated in passing through the final heater C to the required higher temperature, usually from 140 to 150 degrees F. This temperature is practically maintained while the milk flows through the holder, the milk losing in temperature but a few degrees as the holder is suitably insulated or protected against loss of heat. The hot milk occupies a sufficient length of time in flowing through the holder to subject the milk thoroughly to the action of the heat, the period being inversely proportionate to the degree of heat which is imparted to the milk, since with a comparatively high temperature a proportionately shorter period of time is sufficient for rendering most of the bacteria innocuous. For illustration, with a temperature of 140 degrees imparted to the milk a holding period of thirty minutes is suitable, while with a temperature of 150 degrees F. a period of twenty-five minutes would be sufficient. If the hot milk enters the holder with a temperature of about 140 degrees F. it will leave the holder with a temperature of about 138 degrees F., and reach the preliminary heater B with a temperature of about 138 degrees F. In passing upwardly through the coil of this heater the milk parts with a considerable portion of this heat by transferring the same to the cold milk which passes upon this heater with a temperature of about 60 degrees F. and leaves the same with a temperature of about 120 degrees F., while the hot milk escapes from the upper end of the coil with a temperature of about 90 degrees F. The system is regenerative in that a portion of the heat contained in the hot milk is transferred to the incoming cold milk, whereby the hot milk is partially cooled before it is subjected to the final cooling operation in the cooler E by which the milk is cooled to about 40 degrees F. An important economy in heat is thereby effected. The milk reaches the aerater with a temperature of about 120 degrees F., is heated by this heater to a temperature of from 140 to 150 degrees F., as may be desired, and this temperature is practically maintained while the milk flows through the holder. The milk is kept constantly in motion while it is operated upon, whereby a partial separation of the cream, which is liable to take place when the milk is allowed to come to a state of rest, also a coating of the pipes or passages, is avoided, while the milk is thoroughly and uniformly acted upon by the heating and cooling agents.

In the operation of this process the milk is first heated in a film or thin sheet, while exposed to the air, whereby objectionable odors, vapors and gases are driven off; and the milk is then heated and cooled while confined in closed passages, whereby the milk is prevented from absorbing again odors, vapors, germs or bacteria from the surrounding air, and these operations are carried on while the milk is kept constantly in motion, thereby preventing a partial separation of cream and an objectionable coating of the pipes or passages, which are liable to occur when the milk is allowed to come to a state of rest, thus insuring a uniform, thorough and effective pasteurization.

In referring herein to milk we intend to include also milk derivatives, for instance, cream, skimmilk, buttermilk, &c.

We claim as our invention:

1. In a pasteurizing apparatus, the combination of means for heating the milk to the pasteurizing temperature, a holder for the heated milk provided with substantially horizontal sinuous flow channels through which the heated milk flows in a continuous stream while practically maintaining the pasteurizing temperature for the required length of time, and a cooler through which the milk flows after having been subjected to the pasteurizing temperature in the holder, substantially as set forth.

2. In a pasteurizing apparatus, the combination of means for heating the milk to the pasteurizing temperature, a holder for the heated milk provided with substantially horizontal sinuous flow channels through which the heated milk flows in a continuous stream while practically maintaining the pasteurizing temperature for the required length of time, said channels being arranged in several connected tiers one above the other, and a cooler through which the milk flows after having been subjected to the pasteurizing temperature in the holder, substantially as set forth.

3. In a pasteurizing apparatus, the combination of a preliminary heater and aerator, a final heater which receives the partially heated milk therefrom and heats the milk to the pasteurizing temperature, a holder for the heated milk provided with substantially horizontal sinuous flow channels through which the heated milk flows in a continuous stream while practically maintaining the pasteurizing temperature for the required length of time, and a cooler through which the milk flows after having been subjected to the pasteurizing temperature in the holder, substantially as set forth.

Witness our hands in the presence of two subscribing witnesses.

HARVEY FELDMEIER.
CHARLES B. DALZELL.

Witnesses:
GRIFFITH PRICHARD,
W. T. WOLFENDEN.